United States Patent [19]

Ward

[11] Patent Number: 5,531,187
[45] Date of Patent: * Jul. 2, 1996

[54] MULTI-PURPOSE PET HARNESS

[76] Inventor: James F. Ward, 25 Pine Valley Rd., Rome, Ga. 30161

[ * ] Notice: The portion of the term of this patent subsequent to Sep. 25, 2013, has been disclaimed.

[21] Appl. No.: 232,493

[22] Filed: Apr. 25, 1994

Related U.S. Application Data

[63] Continuation-in-part of Ser. No. 992,110, Dec. 17, 1992, Pat. No. 5,305,710.

[51] Int. Cl.$^6$ ................................................ A01K 29/00
[52] U.S. Cl. ................................................ 119/856
[58] Field of Search ................................ 119/769, 771, 119/856

[56] References Cited

U.S. PATENT DOCUMENTS 4,896,630  1/1990  Luce ........................................ 119/771
4,970,991  11/1990 Luce ........................................ 119/771

*Primary Examiner*—Gene Mancene
*Assistant Examiner*—Thomas Price
*Attorney, Agent, or Firm*—Vivian L. Steadman; Harry I. Leon

[57] ABSTRACT

A harness having four sets of straps extendable around a dog's torso, with one of these strap sets being disposed proximate with the dog's neck and another with its hindquarters, at least one longitudinally-extending upper strap member, and a flexible truss including a pair of strips of unequal length coupled together by a connector such as a D-ring slidably received by the strips and movable along substantially the length of the shorter strip. The pair of strips so coupled define a branched structure having branches of continously variable length. The strap sets, as well as the ends of each strip, are attached to the upper strap member, the distal ends of each strip being spaced apart from each other and from the ends of the other strip. Moreover, the distal ends of the shorter strip are disposed proximate with a contiguous pair of sets of straps and with one end of the shorter strip on one side of the midpoint of the upper strap member and the other on the other side of this midpoint. When a dog is suspended in the harness by a leash attached to the connector, the flexible truss supports each of the strap sets of the harness in such a way that the weight of the dog's body is spread substantially evenly along the length of the harness. Alternately, when the leash/harness is used to restrain a dog, restraining forces are transmitted through the connector and into the branched structure in such a way as to avoid applying excessive loads, generally independently of the direction in which the leash is being pulled, to any one particular portion of the animal's body.

4 Claims, 3 Drawing Sheets

MULTI-PURPOSE PET HARNESS

CROSS-REFERENCE TO RELATED APPLICATION

This application is a continuation-in-part of my earlier application, Ser. No. 07/992,110, filed Dec. 17, 1992, now U.S. Pat. No. 5,305,710.

BACKGROUND OF THE INVENTION

1. Field of the Invention

This invention relates to harnesses which can be employed to restrain and to hoist dogs and other vertebrate animals.

2. Description of the Prior Art

Alexander et al., U.S. Pat. No. 4,186,689, disclose a sling for supporting horses and other large four-legged animals in an upright position. The sling includes a pair of end panels, three pairs of sling support straps, and a belly band or sternum abdominal band with four reinforcement strips fastened thereto. The strips themselves are stitched to the end panels which are each equipped with a pocket for receiving a spreader bar. The spreader bars are employed to maintain the width of the sling. The three pairs of sling support straps are each secured to the end panels and are looped through a single D-ring from which the sling and its contents can be suspended. Because the four strips fastened to the belly band generally cannot be used alone to restrain an animal, a plurality of straps which can be secured about the animal fore and aft of its legs are also disclosed.

In my prior pending U.S. patent application identified above, there has been disclosed a harness having a branched structure and a pair of strap members which, in use, extend longitudinally along the pet's backbone and belly, respectively, and at least three sets of straps interconnected with said pair of strap members but extending generally perpendicularly thereto around the pet's torso. The sets of straps are spaced apart from each other, spanning substantially the length of the dog's backbone from neck to hindquarters. The branched structure defines at least as many branches as there are sets of straps, with one end of each branch being attached, in use, to the upper strap member proximate with one of the interconnections between the upper strap member and one of the sets of straps and the other end of each branch being fixedly attached to the leash.

SUMMARY OF THE INVENTION

The subject invention is directed to improvements over applicant's prior teachings by way of providing means for attaching a leash to a connector on the harness which provides a movable, rather than a fixed, juncture between strips or branches through which forces can be transmitted from the leash to the harness and vice versa. Distal ends of the strips are attached to an upper strap member which, when the harness is in use, extends longitudinally along the dog's backbone. In the improved harness, a pair of strips of unequal length is slidably received by the connector and each of these strips defines a pair of branches of variable length. As the direction, relative to the harness, from which a leash attached to the connector is being pulled changes, the lengths of the branches change. Consequently, over a wide range of directions of the leash relative to the harness, each branch is kept in tension, transmitting some of the restraining force from the leash rather than having one or more of the branches completely relaxed. As a result, a more uniform distribution of loads due to restraining forces applied to the leash can be transmitted from the leash to the animal's body than would be achieved if the juncture between the strips were fixed.

The primary object of the present invention is to provide a harness capable of being utilized, in combination with a leash, to restrain an animal in such a way that any restraining forces transmitted from the leash to the harness are distributed generally uniformly over the entire length of the animal's torso, thereby virtually eliminating situations in which the use of the leash could cause an excessive load to be applied to a small portion of the animal's body.

A further object of the present invention is to provide a harness which can be utilized with a leash, to restrain an animal in such a way that any restraining forces transmitted from the leash to the harness are distributed generally uniformly over the entire length of the animal's torso, including the soft, abdominal portion of the torso below the rib cage, so that an animal can be controlled with smaller restraining forces than are typically required for choke collars and for conventional harnesses which transmit restraining forces only to less sensitive portions of the animal's body.

A further object of the present invention is to provide a harness capable of being utilized, in combination with a leash, to hoist the dog aloft, the hoisting means keeping the dog's torso disposed generally parallel with the ground, thereby eliminating any strain on the dog's vertebrae.

A still further object of the present invention is to provide a harness and leash that can be employed in combination to enable a person, with sufficient strength in one of his arms, to safely and singlehandedly hoist a pet off the ground.

In accordance with the present invention, there is provided an improved harness having hoisting means including first and second strips of unequal length, each end of each strip being attached to the upper strap member proximate with one of the interconnections between the upper strap member and the sets of straps extending generally perpendicularly thereto. The distal ends of both the first and second strips, when so attached, are spaced apart from each other and from the ends of the other strip. Importantly, the pair of strips are coupled together by a connector such as a D-ring slidably received by the strips and movable along substantially the length of the shorter strip. The pair of strips so coupled define a branched structure having branch members of continously variable length. The branched structure, along with the upper strap member, defines a flexible truss, through which forces applied to the connector by the leash can be transmitted. Alternately, forces caused by the weight of the dog or the like can be transmitted from the harness to the leash. In either case, the flexible truss facilitates a more uniform distribution of any forces transmitted through the straps of the harness encircling the dog's torso, reducing the likelihood of injury to the animal either when it is being hoisted or restrained.

BRIEF DESCRIPTION OF THE DRAWINGS

Further details are explained below with the help of the examples illustrated in the attached drawings in which.

Like reference characters indicate corresponding parts throughout the several views of the drawings.

DESCRIPTION OF THE PREFERRED EMBODIMENTS

Figure 1:
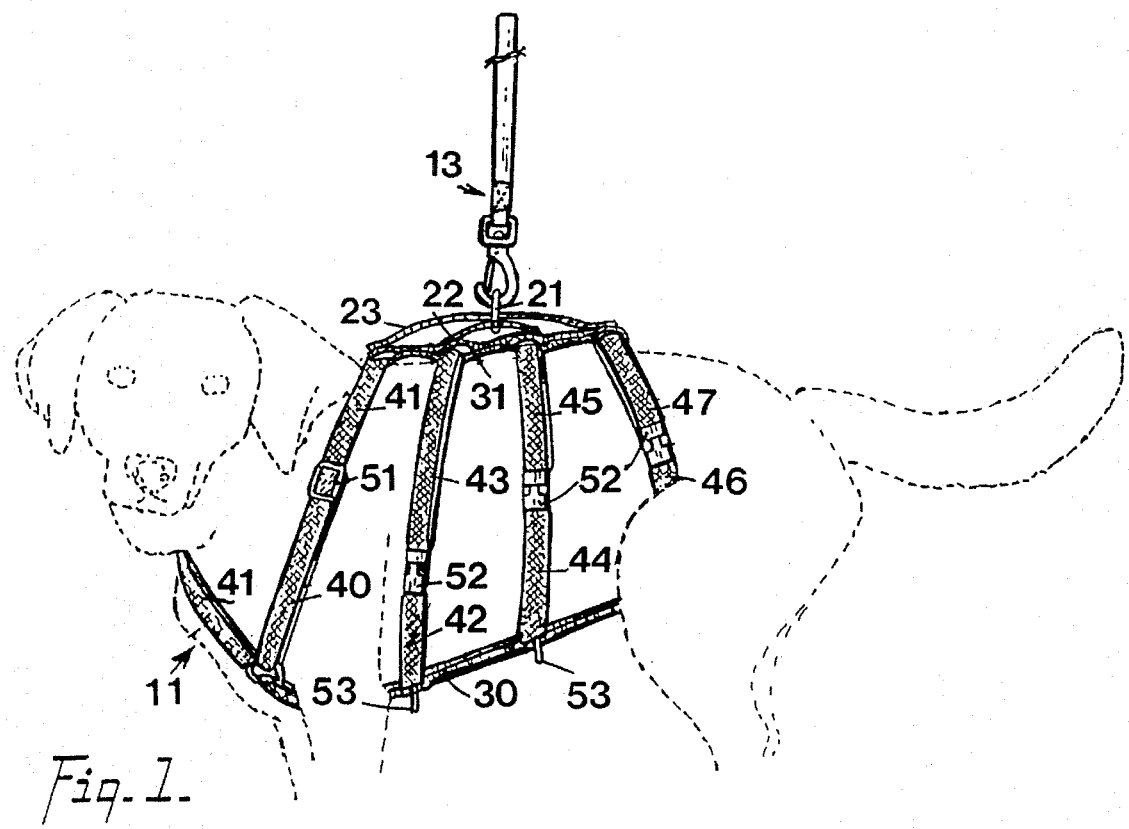
FIG. 1 is a side elevational view of one embodiment of the apparatus according to the present invention in which the harness is shown strapped to a dog in preparation for the dog being suspended in the harness by a leash.

In the drawings, an apparatus according to the present invention comprises a harness 11, and a leash 13. The harness 11 comprises a pair of strap members 30, 31 and at least four sets of straps 40, 41; 42, 43; 44, 45; 46, 47 attached by stitching or the like to said pair of strap members. Extending generally perpendicularly to the straps 40, 41; 42, 43; 44, 45; 46, 47, the pair of strap members 30, 31, in use, extend longitudinally along a pet's backbone and belly, respectively.

As is best seen in FIG. 1, the sets of straps 40, 41; 42, 43; 44, 45; 46, 47 are spaced apart from each other, with each of the straps 41, 47 being disposed proximate with an end of the strap member 31 and separated from each other by a distance substantially equal to the length of a dog's backbone from its neck to its hindquarters. Each of the strap sets 40, 41; and 42, 43; 44, 45; 46, 47 can be adjusted in length using keepers 51 and clasps 52, respectively, so that the harness fits snugly around a dog's torso.

Also attached to the strap member 31 by stitching or the like are the ends of a pair of strips 22, 23 of unequal length. The distal ends of each strip 22, 23 are spaced apart from each other and from the ends of the other strip, with the distal ends of the shorter strip 22 being disposed proximate with a centrally-disposed contiguous pair of sets of straps 42, 43; 44, 45. The distal ends of the longer strip 23, on the other hand, are attached to the strap member 31 proximate, in use, with the dog's neck and hindquarters.

Figure 3:
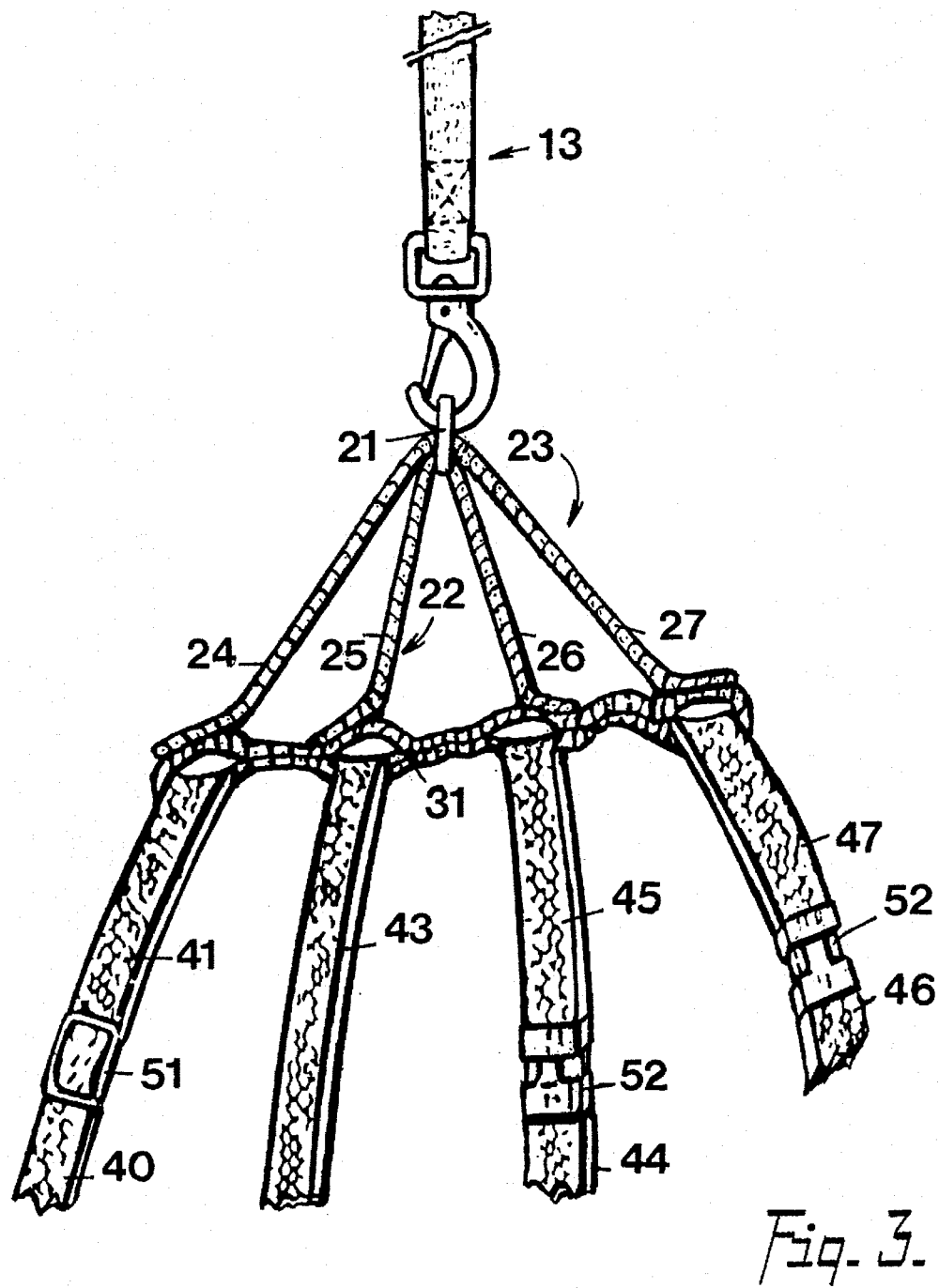
FIG. 3 is a side elevational view on an enlarged scale of a fragmentary portion of the embodiment according to FIG. 1 in which the dog is being suspended in the harness by the leash.
Figure 4:
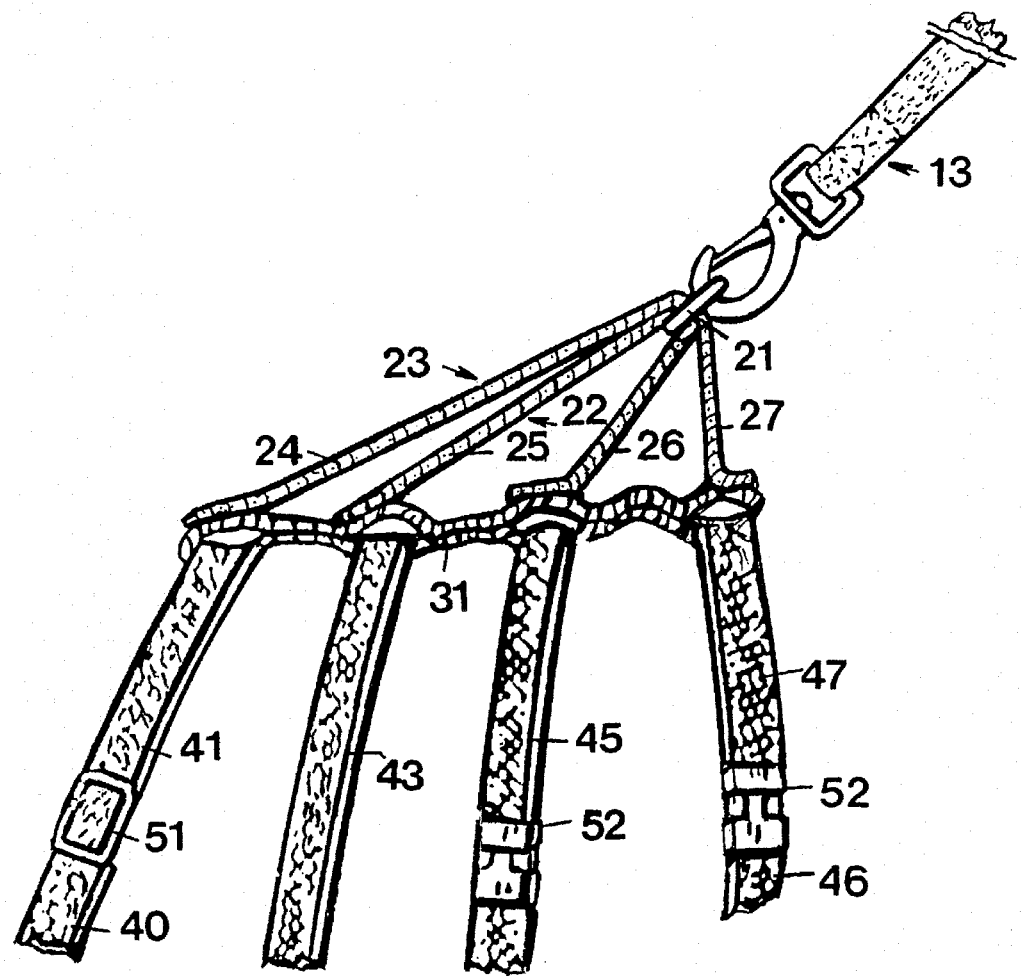
FIG. 4 is a side elevational view on an enlarged scale of a fragmentary portion of the embodiment according to FIG. 1 in which the dog is being restrained in the harness by the leash.

The strips 22, 23 themselves are loosely coupled together by linking means such as a D-ring connector 21 which is slidable along substantially the length of the shorter strip 22. The pair of strips 22, 23 so coupled, define a branched structure having branches 24, 25, 26, 27 of varying lengths, depending upon the position of the connector 21. The branched structure has at least as many branches 24, 25, 26, 27 as there are sets of straps 40, 41; 42, 43; 44, 45; 46, 47 in the harness 11. The branches 24, 25, 26, 27 are attached to the upper strap member 31 at intervals, the longest of these intervals being substantially equal in length to the spacing between the interconnections of the upper strap member with the sets of straps 40, 41; 46, 47 disposed contiguous with the distal ends of the upper strap member (FIGS. 3–4).

The leash 13, which is releasably attachable to the connector 21, can be employed, in combination with the harness 11, to hoist a pet from the ground or, alternately, to restrain the animal. In combination with the strap member 31, the branches 24, 25, 26, 27 comprise a flexible truss which is useful in distributing loads from the leash 13, via the connector 21, to the sets of straps 40, 41; 42, 43; 44, 45; 46, 47.

The lengths of the strips 22, 23 are set so that, in use, generally regardless of the pulling direction, relative to the harness 11, of a leash 13 attached to the connector 21, the flexible truss continues to form triangles between contiguous pairs of branches 24, 25; 25, 26; 26, 27 and a portion of the strap member 31 connecting these contiguous pairs. The lengths of the branches 24, 25, 26, 27 within the flexible truss then change with the forces being transmitted through the connector 21 to these branches. In particular, the lengths of the individual branches 24, 25, 26, 27 adjust to the pulling direction of the leash 13. As a result, over a wide range of directions of the leash 13 relative to the harness 11, each branch 24, 25, 26, 27 is kept in tension transmitting a portion of any restraining forces applied to the leash. Thus, a more uniform distribution of loads from such a restraining force is applied to the animal's body than would be achieved if the strips 22, 23 were fixedly joined to each other.

Tests performed using the harness 11 on several dogs including a 75 lbs. golden Labrador retriever show that a tug of about 10 lbs. on the leash 13 was all the force required to restrain the dog. Typically, much larger, jerk-type forces are needed to control dogs wearing choke collars or harnesses having torso-encircling straps which contact only portions of the dog's torso supported by its rib cage. By distributing restraining forces from the leash 13 to the straps generally uniformly over the entire length of the animal's torso, including the soft, abdominal portion of the torso below the rib cage, the harness 11 allows a handler to control an animal using much smaller restraining forces than would otherwise be required.

In addition, when a pet's body is suspended in the harness 11 by the leash 13 as illustrated in FIG. 3, each branch 24, 25, 26, 27 supports the proximate strap set 40, 41; 42, 43; 44, 45; 46, 47, respectively, so that the weight of the pet's body is spread substantially evenly along the length of the harness. The lengths of the strips 22, 23 are chosen so that for a particular animal, its backbone remains generally parallel to the ground when the animal is being hoisted aloft. The harness 11 and the leash 13 in combination enable a person, with sufficient strength in one of his arms, to hoist a pet singlehandedly off the ground.

Figure 2:
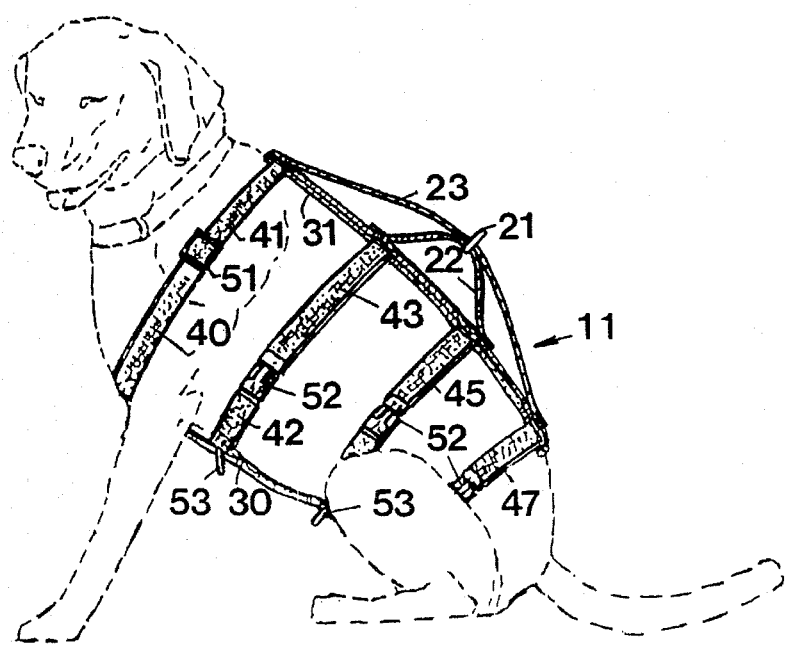
FIG. 2 is a side elevational view of the embodiment according to FIG. 1 in which the harness is shown strapped to a dog.

In the preferred embodiment illustrated in FIGS. 1 and 2, there is further provided means for releasably attaching the harness to a carrier such as is disclosed in my copending patent application. The attaching means includes D-rings 53 secured to the longitudinally extending strap member 30 proximate with its juncture with the strap sets.

In an alternate embodiment, the harness comprises a pair of strap members and three sets of straps fixedly attached thereto for extending longitudinally along a pet's backbone and belly and for encircling a pet's torso, respectively. Attached to the upper strap member are first and second strips of unequal length, the distal ends of the first strip being spaced apart from each other and attached to the upper strap member proximate with its interconnections with two of the sets of torso-encircling straps. These two interconnections are disposed proximate the distal ends of the upper strap member. Only one end of the shorter second strip is fixedly attached to the upper strap member, the second strip being so attached proximate with the midpoint of the strap member and its interconnection with the third set of straps. The free end of the second strip is fixedly attached to linking means such as a D-ring connector in which the first strip is received and which is slidable along substantially the length of the first strip.

Similarly to the strips 22, 23 and the strap member 31 in the preferred embodiment illustrated in FIGS. 1 through 4, the lengths of the first and second strips are set so that over a wide range of directions of the leash relative to the harness, each branch of the first strip and the second strip are kept in tension, transmitting a portion of any restraining forces applied to the leash. As a result, the first strip, the second strip and portions of the upper strap member connecting respective contiguous branches and the second strip form a flexible truss useful in providing a more uniform distribution of loads from such a restraining force to the animal's body than would be achieved if the first and second strips were fixedly joined to each other.

What is claimed is:

1. An apparatus adapted for restraining a pet, which comprises:
   (a) a harness, the harness having an upper strap member adapted to extend longitudinally along the pet's backbone and four sets of straps interconnected with said upper strap member but extending generally perpendicularly thereto;
   (b) first and second strips of unequal length, distal ends of the first and second strips being attached to the upper strap member proximate with one of the interconnections between the upper strap member and the sets of straps extending generally perpendicularly thereto; the distal ends of both the first and second strips being spaced apart from each other; each end of the first strip being spaced apart from both ends of the second strip; and
   (c) means including a connector which is slidably received by both the first and second strips for flexibly coupling them together, portions of the upper strap member and the strips so coupled defining a flexible truss through which, during normal use, forces applied to the connector tend to be distributed evenly to each of the straps.

2. An apparatus adapted for restraining a pet, which comprises:
   (a) a harness, the harness having an upper strap member adapted to extend longitudinally along the pet's backbone and at least three sets of straps interconnected with said upper strap member but extending generally perpendicularly thereto;
   (b) first and second strips of unequal length, each end of the first strip and at least one end of the second strip being attached to the upper strap member proximate with one of the interconnections between the upper strap member and the sets of straps extending generally perpendicularly thereto; the ends of both the first and second strips, when so attached, being spaced apart from each other; each end of the second strip attached to the upper strap member being spaced apart from both ends of the first strip; and
   (c) linking means which is connected to the second strip and slidably received by at least one of the strips for flexibly coupling the first and second strips, portions of the upper strap member and the strips so coupled defining a flexible truss through which, during normal use, forces applied to the connector tend to be distributed to each of the straps.

3. An apparatus adapted for transporting a pet, which comprises hoisting means including a harness, the harness having an upper strap member with distal ends which is adapted to extend longitudinally along the pet's backbone and at least three sets of straps interconnected with said upper strap member but extending generally perpendicularly thereto, contiguous pairs of sets of straps at their respective interconnections with the upper strap member being spaced apart from each other, the hoisting means further comprising a branched structure, the branched structure being attached to the upper strap member at intervals along the upper strap member, the longest of these intervals being substantially equal in length to spacing between the interconnections of the upper strap member with sets of straps disposed contiguous with the distal ends of the upper strap member.

4. An apparatus adapted for transporting a pet, which comprises hoisting means including a harness, the harness having an upper strap member adapted to extend longitudinally along the pet's backbone and at least three sets of straps interconnected with said upper strap member but extending generally perpendicularly thereto, the hoisting means further comprising a branched structure, the branched structure being attached to the upper strap proximate with each interconnection between the upper strap member and the sets of straps, the branched structure defining at least as many branches as there are sets of straps, each branch being attached to the upper strap member proximate with points where the upper strap member is interconnected with one of the sets of straps.

* * * * *